(12) United States Patent
Kim et al.

(10) Patent No.: US 9,774,708 B2
(45) Date of Patent: Sep. 26, 2017

(54) NETWORK NODE AND METHOD OF OPERATING THE NETWORK NODE

(71) Applicant: Samsung Electronics Co., Ltd., Suwon-si (KR)

(72) Inventors: Eunah Kim, Seoul (KR); Seogchung Seo, Seoul (KR); Myeongwuk Jang, Hwaseong-si (KR); Sangwon Hyun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 125 days.

(21) Appl. No.: 14/694,804

(22) Filed: Apr. 23, 2015

(65) Prior Publication Data

US 2015/0358436 A1    Dec. 10, 2015

(30) Foreign Application Priority Data

Jun. 10, 2014    (KR) .................. 10-2014-0069961

(51) Int. Cl.
*H04L 29/06* (2006.01)
*H04L 12/741* (2013.01)
*H04L 29/08* (2006.01)

(52) U.S. Cl.
CPC .......... *H04L 69/22* (2013.01); *H04L 45/745* (2013.01); *H04L 63/0428* (2013.01);
(Continued)

(58) Field of Classification Search
CPC ... H04L 69/22; H04L 63/0428; H04L 63/065; H04L 63/10; H04L 63/168; H04L 45/745; H04L 67/327
See application file for complete search history.

(56) References Cited

U.S. PATENT DOCUMENTS 8,386,622 B2    2/2013  Jacobson
9,455,835 B2 *  9/2016  Mosko ................ H04L 63/12
(Continued)

FOREIGN PATENT DOCUMENTS

JP    2009-277234 A    11/2009
JP    2009-278624 A    11/2009
(Continued)

OTHER PUBLICATIONS

Mosko, Marc. "CCNx 1.0 Protocol Introduction." *Palo Alto Research Center, Inc.* Apr. 2, 2014 ( 10 pages in English).
(Continued)

*Primary Examiner* — Paul H Masur
(74) *Attorney, Agent, or Firm* — NSIP Law

(57) ABSTRACT

A method of operating a network node includes receiving a response packet including an encoded content name, storing the response packet, decoding the encoded content name, and transmitting the response packet based on the decoded content name, receiving a request packet, decoding at least some of encoded content names included in pre-stored response packets, determining whether a pre-stored response packet corresponding to a content name included in the request packet is present among the pre-stored response packets based on the decoded content names, and transmitting the pre-stored response packet in response to the pre-stored response packet being present.

25 Claims, 17 Drawing Sheets

(52) U.S. Cl.
CPC ............ *H04L 63/065* (2013.01); *H04L 63/10* (2013.01); *H04L 63/168* (2013.01); *H04L 67/327* (2013.01)

(56) References Cited

U.S. PATENT DOCUMENTS

| | | | |
|---|---|---|---|
| 9,614,897 B2* | 4/2017 | Bae | H04L 67/10 |
| 9,621,671 B2* | 4/2017 | Kim | H04L 67/2852 |
| 2009/0285209 A1 | 11/2009 | Stewart et al. | |
| 2012/0054310 A1* | 3/2012 | Kim | H04L 67/1078 709/218 |
| 2012/0314580 A1 | 12/2012 | Hong et al. | |
| 2012/0317613 A1* | 12/2012 | Kim | H04L 63/10 726/1 |
| 2013/0018937 A1* | 1/2013 | Kim | G06F 17/30902 709/202 |
| 2013/0074155 A1* | 3/2013 | Huh | H04L 63/065 726/3 |
| 2014/0149733 A1 | 5/2014 | Kim | |
| 2015/0222603 A1* | 8/2015 | Uzun | H04L 63/0428 713/160 |
| 2015/0312300 A1* | 10/2015 | Mosko | H04L 63/164 713/171 |
| 2015/0312373 A1* | 10/2015 | Muramoto | H04L 47/283 370/238 |
| 2016/0087876 A1* | 3/2016 | Fan | H04L 67/32 709/242 |
| 2016/0087881 A1* | 3/2016 | Ge | H04L 45/42 709/244 |

FOREIGN PATENT DOCUMENTS

| | | |
|---|---|---|
| JP | 2011-244445 A | 12/2011 |
| KR | 10-2011-0125481 A | 11/2011 |
| KR | 10-2012-0054839 A | 5/2012 |
| KR | 10-2012-0136544 A | 12/2012 |
| KR | 10-2012-0137726 A | 12/2012 |
| KR | 10-2013-0031660 A | 3/2013 |
| KR | 10-2013-0048032 A | 5/2013 |
| KR | 10-2013-0080626 A | 7/2013 |
| WO | WO 2014/059622 A1 | 4/2014 |

OTHER PUBLICATIONS

Extended European Search Report issued on Nov. 5, 2015, in counterpart European Application No. 151152227.3 (8 pages, in English).

J. Bethencourt et al., "Ciphertext-Policy Attribute-Based Encryption," *Proceedings of the 2007 IEEE Symposium on Security and Privacy ((S&P 2007)*, pp. 321-334, conference held in Berkeley/Oakland, California, on May 20-23, 2007, paper presented on May 23, 2007.

V. Jacobson et al., "Networking Named Content," *Proceedings of the 5th International Conference on Emerging Networking Experiments and Technologies (CoNEXT 2009)*, 2009, pp. 1-12, conference held in Rome, Italy, on Dec. 1-4, 2009, paper presented on Dec. 2, 2009.

* cited by examiner

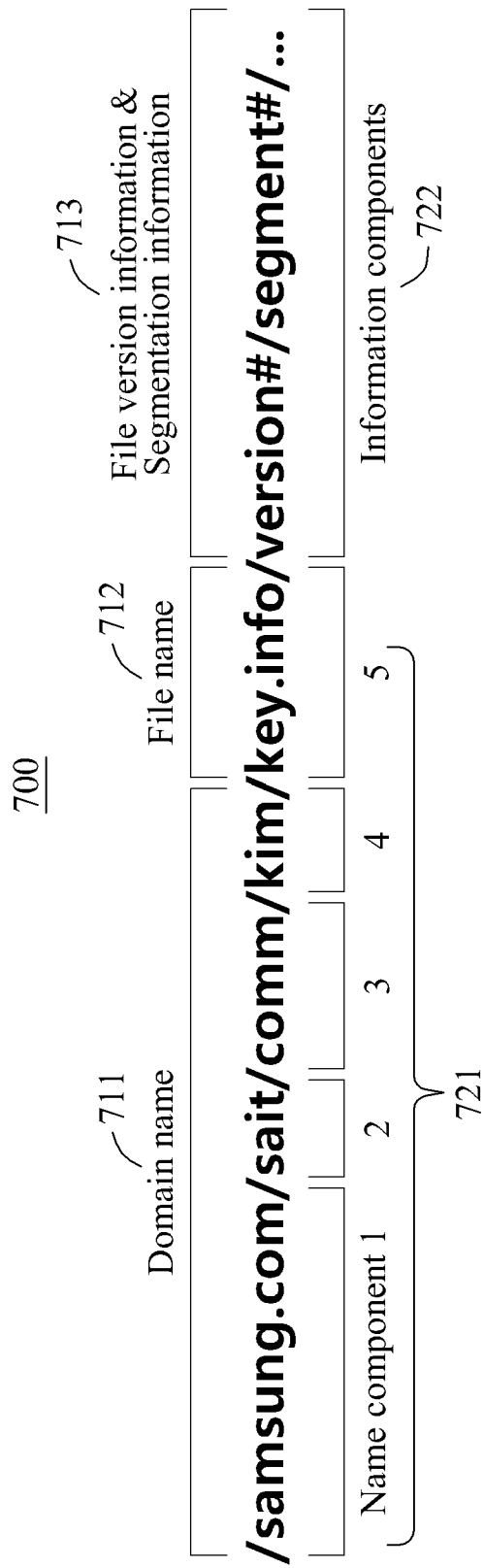

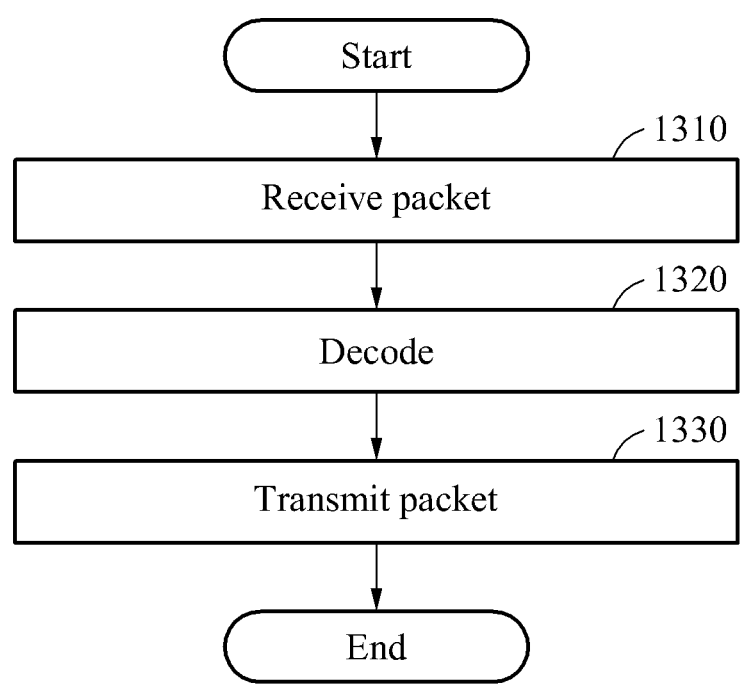

NETWORK NODE AND METHOD OF OPERATING THE NETWORK NODE

CROSS-REFERENCE TO RELATED APPLICATIONS

This application claims the benefit under 35 USC 119(a) of Korean Patent Application No. 10-2014-0069961 filed on Jun. 10, 2014, in the Korean Intellectual Property Office, the entire disclosure of which is incorporated herein by reference for all purposes.

BACKGROUND

1. Field

The following description relates to a network node and a method of operating the network node.

2. Description of Related Art

With a recent widespread use of a smart phone, a voice-over-Internet protocol (VoIP), and an IP television (IPTV), a value of the Internet is rapidly gaining momentum in all fields of society. This growth in Internet services may arise from a functional independence of an IP layer. The IP layer in a transmission control protocol (TCP)/IP stack provides transparency between a high-level layer and a low-level layer.

However, a future Internet environment may require a novel design of a content-centric architecture rather than an existing host-centric architecture. For example, achieving an optimal performance may not be ensured based on the existing host-centric architecture in a future Internet environment in which emphasis is placed on content search and content access.

In recent times, a new content-centric Internet architecture is experiencing a surge in research activity. The content-centric Internet architecture includes a structure in which a network packet is transmitted based on a content name.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of operating a network node includes receiving a response packet including an encoded content name; decoding the encoded content name; and transmitting the response packet based on the decoded content name.

The encoded content name may be encoded based on a predetermined condition; the network node may satisfy the predetermined condition; and the decoding may include decoding the encoded content name based on the predetermined condition.

The predetermined condition may be set by a network node configured to generate the response packet to limit a network range in which transmission of the response packet is allowed.

The encoded content name may be encoded based on an attribute rule including at least one attribute.

The at least one attribute may include either one or both of domain information; and interface information.

The attribute rule may be associated with an access authority with respect to content included in the response packet.

The decoding may include decoding the encoded content name based on an attribute of the network node.

The decoding may include decoding the encoded content name in response to the attribute of the network node satisfying an attribute rule used in the encoding of the encoded content name.

The attribute of the network node may include either one or both of domain information of the network node; and interface information of the network node.

The encoded content name may be encoded using an attribute rule, a public key, and a content name.

The decoding may include decoding the encoded content name using at least one secret key corresponding to an attribute of the network node.

The method may further include performing certification on a certificate authority; and receiving, from the certificate authority, the at least one secret key corresponding to the attribute of the network node; and the at least one secret key corresponding to the attribute of the network node may be one of a plurality of secret keys generated by the certificate authority corresponding to a single public key.

The transmitting of the response packet may include extracting request information corresponding to the decoded content name from pre-stored request information; and transmitting the response packet based on the extracted request information.

The method may further include receiving a request packet; decoding at least some of encoded content names included in pre-stored response packets; extracting a response packet corresponding to a content name included in the request packet based on the decoded content names; and transmitting the extracted response packet in response to the request packet.

The method may further include receiving a request packet; extracting a content corresponding to a content name included in the request packet from pre-stored contents; encoding the content name; generating a response packet including the encoded content name and the extracted content; and transmitting the generated response packet in response to the request packet.

The encoding may include encoding the content name using an attribute rule, a public key, and the content name.

The public key may correspond to a plurality of secret keys; and the encoded content name may be decoded by at least one secret key corresponding to an attribute that satisfies the attribute rule.

The method may further include receiving a request packet; determining whether a content corresponding to a content name included in the request packet is present among pre-stored contents; decoding at least some of encoded content names included in pre-stored response packets; determining whether a response packet corresponding to the content name included in the request packet is present among the pre-stored response packets based on the decoded content names; storing request information based on a result of the determining being that the content corresponding to the content name and the response packet corresponding to the content name are absent; and transmitting the request packet to a network.

In another general aspect, a non-transitory computer-readable storage medium stores a program including instructions to cause a computer to perform the method described above.

In another general aspect, a network node includes a receiver configured to receive a response packet including an encoded content name; a decoder configured to decode the encoded content name; and a transmitter configured to transmit the response packet based on the decoded content name.

In another general aspect, a method of operating a network node includes receiving a response packet including an encoded content name; determining whether another network node is authorized to receive the response packet based on the encoded content name; not transmitting the response packet to the other network node in response to a result of the determining being that the other network node is not authorized to receive the response packet; and transmitting the response packet to the other network node in response to a result of the determining being that the other network node is authorized to receive the response packet.

The determining may include attempting to decode the encoded content name based on information relating to the other network node; determining that the network node is not authorized to receive the response packet in response to a result of the attempting being that the encoded content name cannot be decoded; and determining that the network node is authorized to receive the response packet in response to a result of the attempting being that the encoded content name is decoded.

The transmitting may include transmitting the response packet to the other network node based on the decoded content name.

The information related to the other network node may include information on an interface of the network node via which the response packet is to be transmitted to the other network node.

The information related to the other network node may include network domain information of the other network node.

Other features and aspects will be apparent from the following detailed description, the drawings, and the claims.

BRIEF DESCRIPTION OF THE DRAWINGS

FIGS. 7 through 10 illustrate an example of a scenario.
FIG. 13 illustrates an example of a method of operating a network node.

DETAILED DESCRIPTION

Figure 1:
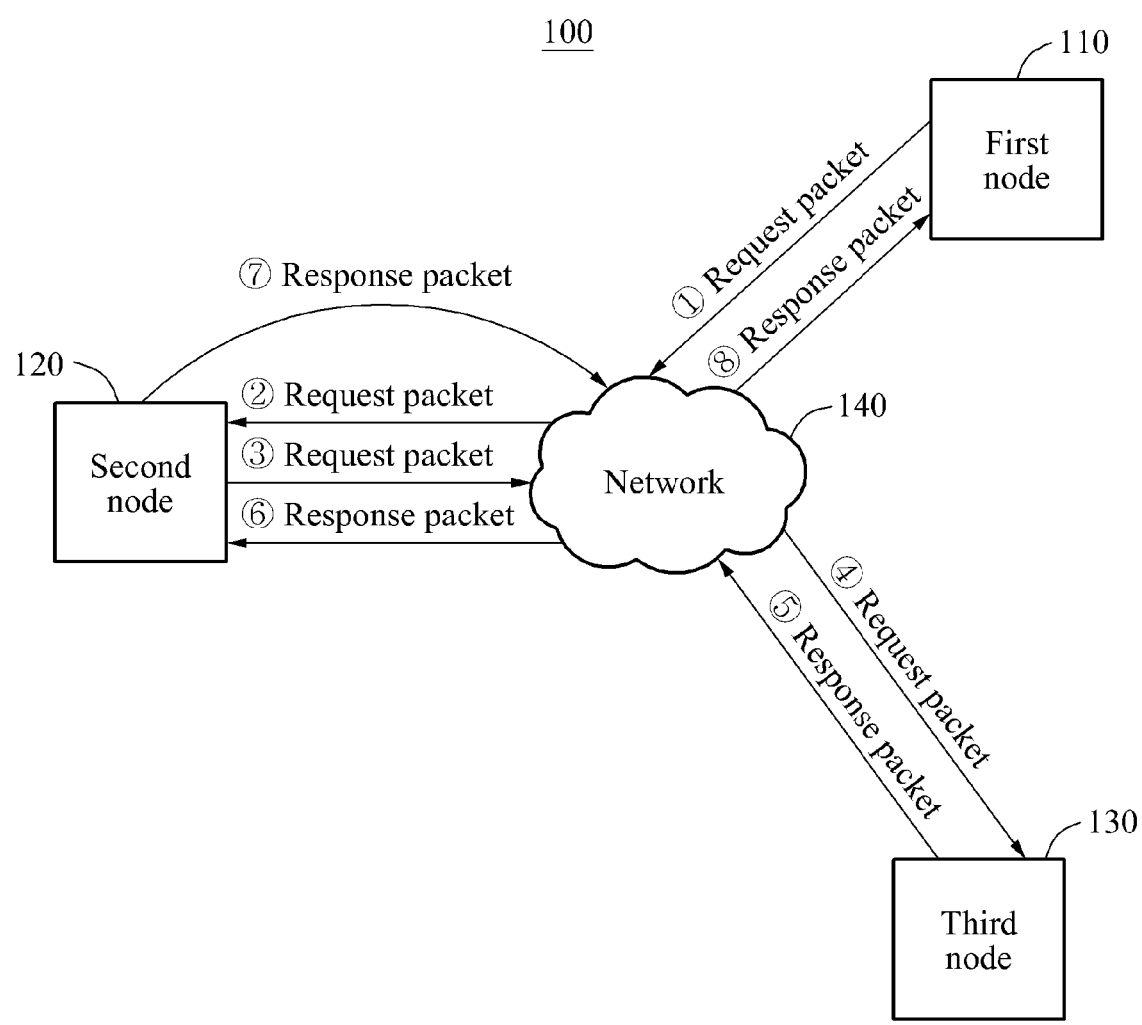
FIG. 1 illustrates an example of a network system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art. The examples to be discussed hereinafter may be applied to a network routing method or a network forwarding method.

FIG. 1 illustrates an example of a network system 100. Referring to FIG. 1, the network system 100 includes a plurality of network nodes connected to a network 140. Each of the plurality of network nodes is a network device or network equipment that participates in packet transmission via the network 140, for example, a router. Hereinafter, each of the network nodes will be referred to as a "node" for ease of description.

A network packet in the network system 100 is routed or forwarded based on a content name. The network packet may be a request packet or a response packet. The request packet is generated by a node requesting content, and the response packet is generated by a node initially providing the requested content. The node initially providing the requested content may be a node from which the requested content originates. Hereinafter, the term "content" refers to a general content file, and also includes all types of contents, for example, a list of content names or a name of a network domain in which content is stored.

The request packet and the response packet include a content name. The request packet and the response packet in the network system 100 are routed or forwarded based on the content name. Hereinafter, routing or forwarding will be referred to as "transmission".

The network system 100 includes a first node 110, a second node 120, and a third node 130. The first node 110 is a node requesting content, and will also be referred to as a "request node". The first node 110 requests content from the network 140 using the content name. For example, the first node 110 generates a request packet including the content name.

Figure 2A:
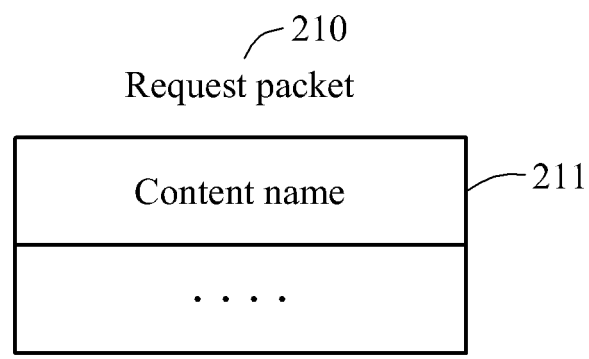
FIG. 2A illustrates an example of a request packet.

FIG. 2A illustrates an example of a request packet. Referring to FIG. 2A, a request packet 210 includes a content name 211.

The first node 110 transmits the request packet to the network 140 in ①.

The request packet transmitted by the first node 110 is transmitted to the second node 120 via the network 140 in ②. The second node 120 receives the request packet from the network 140, and identifies the content name included in the request packet. The second node 120 determines whether content corresponding to the content name is stored in the second node 120. In this example, the second node 120 does not store the content corresponding to the content name, so the second node 120 transmits the request packet to the network 140 based on the content name in ③. The second node 120 will be also referred to as an "intermediate node".

The request packet transmitted by the second node 120 is transmitted to the third node 130 via the network 140 in ④. The third node 130 receives the request packet from the network 140, and identifies the content name included in the request packet. The third node 130 determines whether content corresponding to the content name is stored in the third node 130. In this example, the third node 130 stores the content corresponding to the content name, so the third node 130 generates a response packet using the content corresponding to the content name. The third node 130 will be also referred to as a "generation node".

The third node 130 encodes the content name, and includes the encoded content name in the response packet. In the network system 100, routing or forwarding of the response packet may be controlled by encoding the content name included in the response packet because the network packet is routed or forwarded based on the content name included in the network packet.

For example, the third node 130 encodes the content name based on a predetermined condition. In this example, decoding the encoded content name is limited to a node that satisfies the predetermined condition. The predetermined condition is set by the third node 130. The predetermined condition is set by the third node 130 to limit a network range in which transmission of the response packet is allowed. For example, the network range may include a domain range such as "samsung.com/sait". A node that wishes to transmit the response packet exceeding the network range set by the third node 130 cannot decode the encoded content name included in the response packet. For example, a node that wishes to transmit the response packet to "samsung.com/dmc" or "samsung.com", which exceeds the domain range "samsung.com/sait", cannot decode the encoded content name included in the response packet. As another example, a node that wishes to transmit the response packet to "samsung.com/sait/ip_group" or "samsung.com/sait/invention_group", which belongs to the domain range "samsung.com/sait", can decode the encoded content name included in the response packet. When the encoded content name cannot be decoded, the content name cannot identified. When the content name cannot be identified, the response packet cannot be transmitted in the network system 100.

Figure 2B:
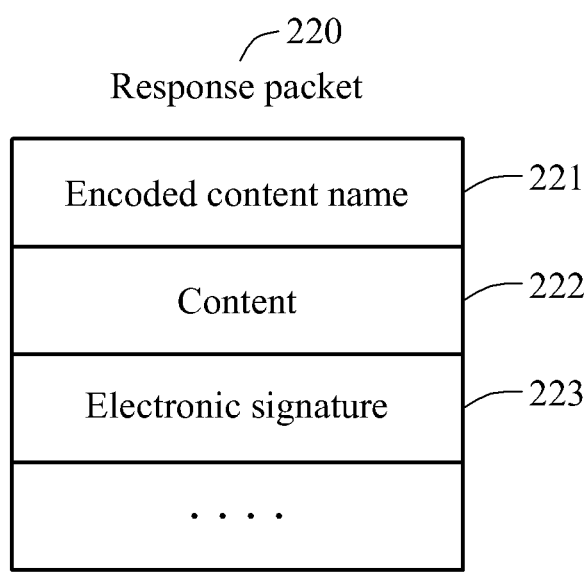
FIG. 2B illustrates an example of a response packet.

FIG. 2B illustrates an example of a response packet. Referring to FIG. 2B, a response packet 220 includes an encoded content name 221 and content 222. The content 222 may also be encoded in a manner similar to the encoded content name 221. The response packet 220 further includes an electronic signature 223. The electronic signature 223 is information that verifies a generation node initially providing the content 222 and indicates that the generation node has signed the content 222.

The third node 130 transmits the response packet to the network 140 in response to the request packet in ⑤. The response packet is transmitted in a sequence reverse to a sequence in a path through which the request packet was transmitted. The response packet transmitted by the third node 130 is transmitted to the second node 120 via the network 140 in ⑥.

The second node 120 receives the response packet from the network 140, and determines whether the encoded content name included in the response packet can be decoded. When the encoded content name cannot be decoded, the second node 120 cannot transmit the response packet to the network 140. When the encoded content name can be decoded, the second node 120 transmits the response packet to the network 140 based on the decoded content name in ⑦. The response packet transmitted by the second node 120 is transmitted to the first node 110 via the network 140 in ⑧.

Figure 3:
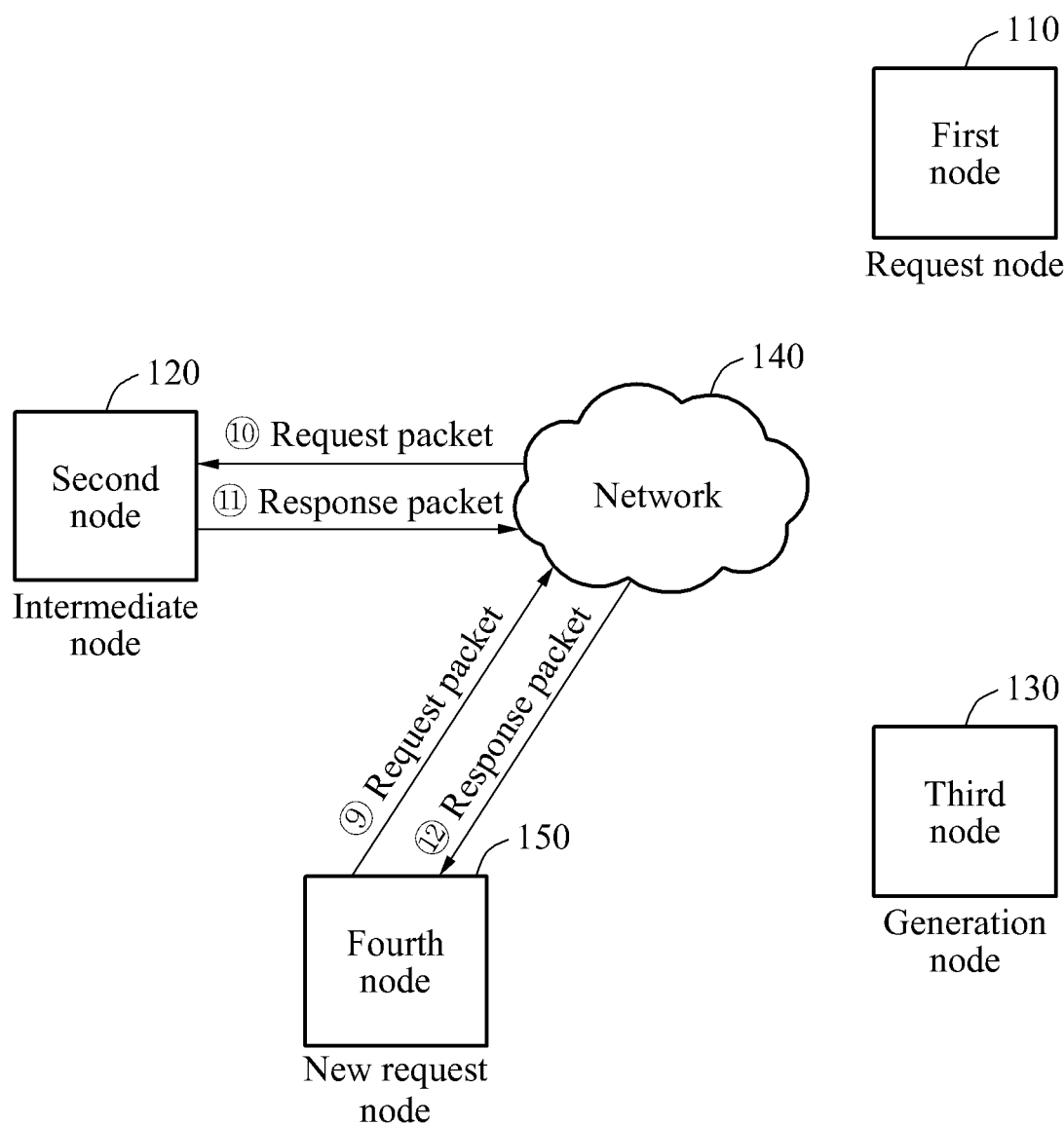
FIG. 3 illustrates another example of a network system.

FIG. 3 illustrates another example of a network system. Referring to FIG. 3, a fourth node 150, for example, a new request node appearing subsequent to a scenario of FIG. 1, transmits a request packet to the network 140 in ⑨. The fourth node 150 requests content initially provided by the third node 130, for example, the generation node in the scenario of FIG.

The request packet transmitted by the fourth node 150 is transmitted to the second node 120 via the network 140 in ⑩. The second node 120 receives the request packet from the network 140, and identifies the content name included in the request packet. The second node 120 determines whether the second node 120 stores content corresponding to the content name. The second node 120 decodes at least some of encoded content names included in pre-stored response packets. The second node 120 determines whether any of the decoded content names correspond to the content name included in the request packet.

The second node 120 stores the response packet received in ⑥ in the scenario of FIG. 1. In this example, the second node 120 detects this stored response packet as corresponding to the content name included in the request packet. The second node 120 transmits the detected response packet to the network 140 in response to the request packet in ⑪. The response packet transmitted by the second node 120 is transmitted to the fourth node 150 via the network 140 in ⑫.

Figure 4A:
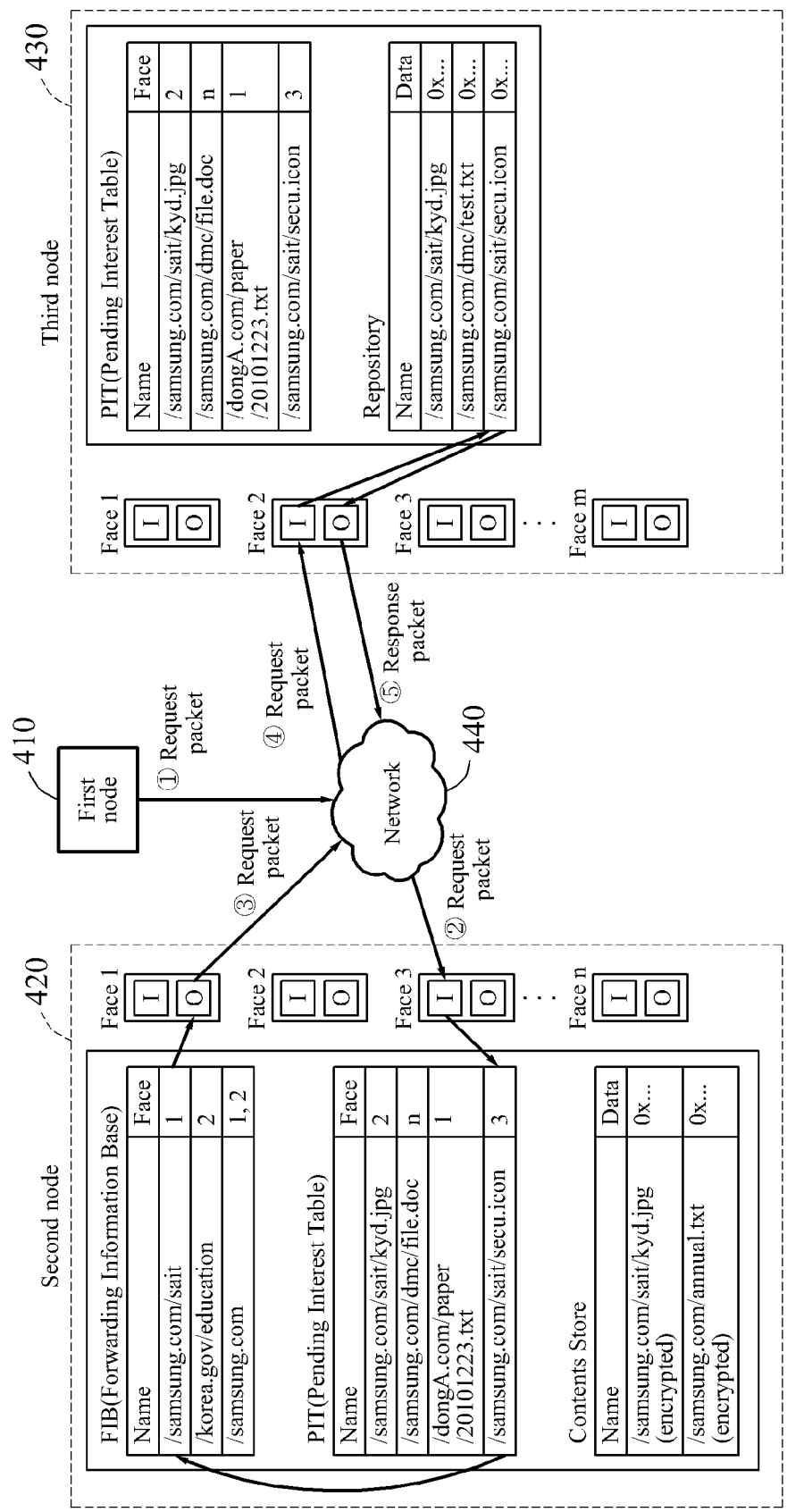
FIGS. 4A through 4C illustrate an example of a content-centric networking (CCN) system.
Figure 4B:
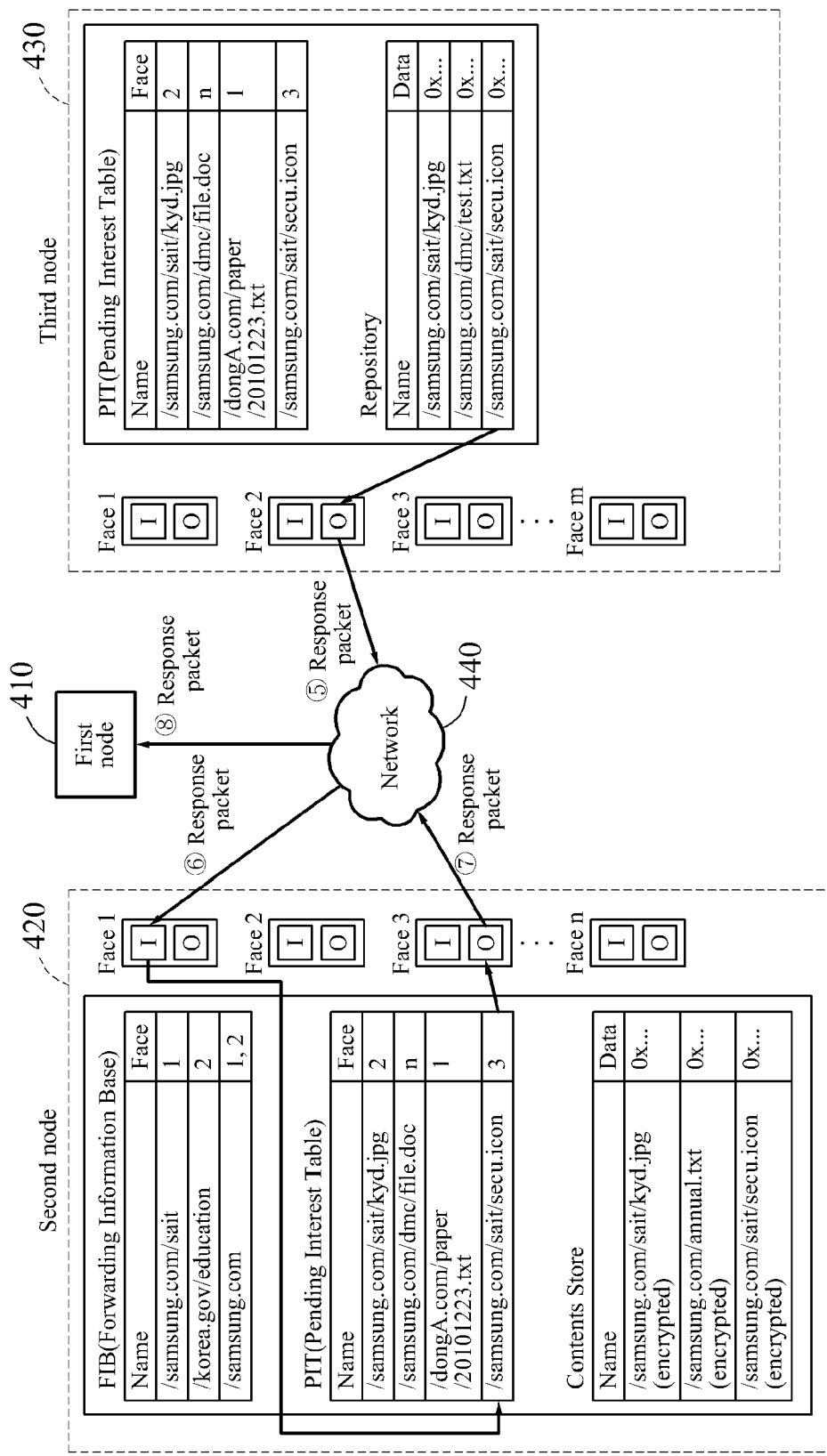
Figure 4C:
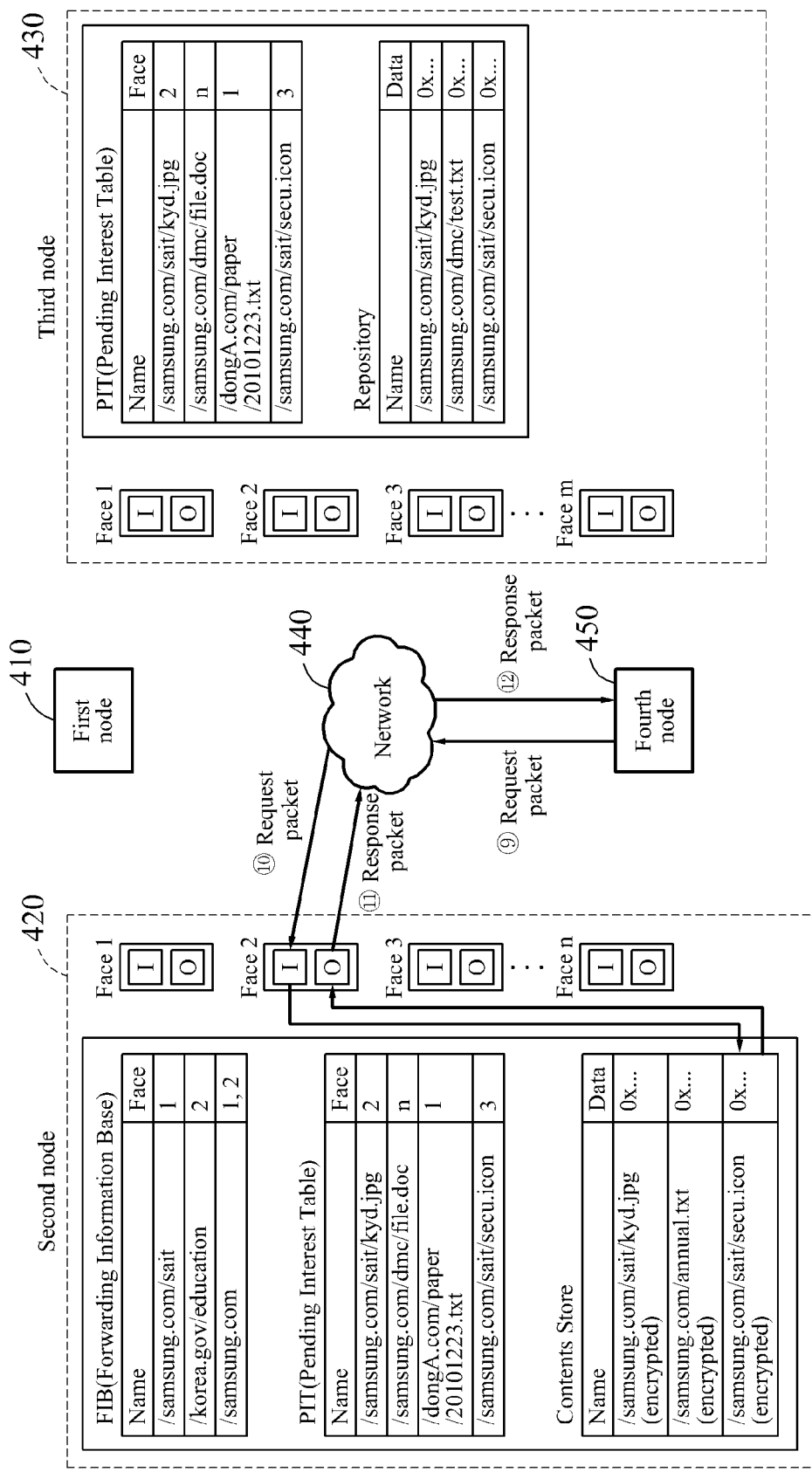

FIGS. 4A through 4C illustrate an example of a content-centric networking (CCN) system. Nodes, a request packet, and a response packet used in the CCN system are defined in the following Table 1.

TABLE 1

Requester: Node requesting content
Generator: Node initially providing content
Container: Node containing content
Responder: Generic term for generator and container
INTEREST packet: Request packet generated by requester including content name
DATA packet: Response packet generated by responder including content The INTEREST packet includes a name of requested content, a selector indicating a preference with respect to content and responder filtering information, and nonce, which is a predetermined value for detecting duplicate reception of the INTEREST packet. The content name is provided in a form of a uniform resource identifier (URI). The DATA packet includes a content name, an electronic signature of the content, a signature algorithm, generator information, a key storage directory server, and packet expiration information.

The requester specifies a desired content name in the INTEREST packet, and broadcasts the INTEREST packet. The container or the generator that receives the INTEREST packet verifies the content name inside the INTEREST packet, and when content corresponding to the content name is stored in the container or generator, responds by transmitting a DATA packet including the content.

Referring to FIG. 4A, a first node 410 is a requester, a third node 430 is a generator, a request packet is an INTEREST packet, and a response packet is a DATA packet. A second node 420 serves as a container subsequent to receiving a response packet.

A structure of a content name used in the CCN system is provided in a hierarchical structure in a manner similar to a structure of an IP address. The content name includes a plurality of components, for example, information on a server address, a content name, and a content version in a manner similar to the IP address including a network address and an identification (ID) address.

In the CCN system, a network packet is routed based on a longest prefix matching scheme. In the CCN system, longest prefix matching is performed using a content name in a manner dissimilar to an IP network system in which the longest prefix matching is performed using an IP address. As used herein, the term "prefix" refers to a domain name to which content belongs. For example, the prefix is provided in a hierarchical name structure, such as a URL. Storages defines in the following Table 2 are employed for the longest prefix matching in each node.

TABLE 2

Forwarding Information Base (FIB): Prefix of content name and interface list are included. Subsequent interface is specified in manner similar to IP address network. Plurality of interfaces are specified in manner dissimilar to IP address network.
Pending Interest Table (PIT): Content name and requesting face are included. Interface that receives request packet from requester is stored for use in forwarding response packet to requester.
Contents Store (CS): Temporary storage of content in network node. Encoded content name and response packet are included. Response packet is received from responder, and is stored for a greatest possible duration of time subsequent to transmitting response packet to requester for content caching.
Repository: Content storage in network node. Content name and content are included.

The first node 410 transmits a request packet including a content name to the network 440 in ①. For example, the request packet is "Interest://samsung.com/sait/secu.icon". The request packet transmitted by the first node 410 is transmitted to the second node 420 via the network 440 in ②.

The second node 420 receives the request packet via the network 440. For example, the second node 420 receives the request packet via an input interface of "face 3". As used herein, the term "face" refers to an interface used for transmission and reception of a network packet.

The second node 420 verifies whether the content name included in the request packet is stored in the CS of the second node 420. The second node 420 decodes at least some of encoded content names stored in the CS, and determines whether a response packet corresponding to the content name included in the request packet is stored in the CS based on the decoded content names.

The second node 420 verifies whether content corresponding to the content name included in the request packet is stored in a repository (not shown). As used herein, the term "repository" refers to a storage device, for example, a hard disk drive (HDD) or a solid state drive (SSD).

When the response packet is not stored in the CS and the content is not stored in the repository, the second node 420 stores, in a PIT, the content name included in the request packet and the interface via which the request packet was received. For example, the second node 420 stores "/samsung.com/sait/secu.icon" and "face 3". As will be described below, values stored in the PIT are used to transmit the response packet to the first node 410 that transmitted the request packet.

The second node 420 selects an interface to forward the request packet with reference to an FIB. The second node 420 detects a network domain name from network domain names stored in the FIB by looking up a longest prefix matching the content name included in the request packet. The second node 420 selects an interface corresponding to the detected network domain name. For example, the second node 420 detects "/samsung.com/sait", which is a longest prefix match with "samsung.com/sait/secu.icon" among "/samsung.com/sait", "korea.gov/education", and "/samsung.com" stored in the FIB. The second node 420 selects an interface, for example, "face 1", corresponding to the detected "/samsung.com/sait".

The second node 420 transmits the request packet using the selected interface in ③. For example, the second node 420 transmits the request packet using an output interface of the selected interface "face 1". The request packet transmitted by the second node 420 is transmitted to the third node 430 via the network 440 in ④. For example, a plurality of intermediate nodes between the second node 420 and the third node 430 may forward the request packet. The plurality of intermediate nodes operate in a manner that is the same as or similar to the second node 420, and thus a repeated description will be omitted for conciseness.

The third node 430 receives the request packet from the network 440. For example, the third node 430 receives the request packet via an input interface of "face 2". The third node 430 verifies whether the content name included in the request packet is stored in a CS (not shown). The third node 430 decodes at least some of the encoded content names stored in the CS, and determines whether a response packet corresponding to the content name included in the request packet is stored in the CS based on the decoded content names. The third node 430 verifies whether content corresponding to the content name is stored in a repository.

When the content is stored in the repository, the third node 430 generates a response packet. The third node 430 encodes the content name. For example, the third node 430 sets a condition of limiting a network range in which transmission of the response packet is allowed, and encodes the content name based on the set condition. The third node 430 includes the encoded content name in the response packet.

The third node 430 includes the content in the response packet. For example, the third node 430 includes a segment of the content in the response packet obtained by dividing the content into segments.

The third node 430 transmits the response packet via an output interface of a face via which the response packet was received in ⑤. For example, the third node 430 transmits the response packet via an output interface of "face 2".

Referring to FIG. 4B, the response packet transmitted by the third node 430 is transmitted to the second node 420 via the network 440 in ⑥. The second node 420 receives the response packet from the network 440. For example, the second node 420 receives the response packet via an input interface of "face 1". In this example, "face 1" is the face that was used by the second node 420 to forward the request packet in ③ in FIG. 4A.

The second node 420 stores the received response packet. For example, the second node 420 stores an encoded content name and content included in the response packet in the CS. A form of the encoded content name and the content to be stored in the CS may include various modifications.

The second node 420 decodes the encoded content name included in the response packet. The second node 420 detects an element corresponding to the decoded content name from elements stored in the PIT. The second node 420 transmits the response packet based on interface information of the detected element in ⑦. For example, the second node 420 decodes the encoded content name included in the response packet, and detects "/samsung.com/sait/secu.icon" stored in the PIT. In this example, the second node 420 transmits the response packet using "face 3" stored corresponding to "/samsung.com/sait/secu.icon".

The second node 420 decodes the encoded content name based on the interface information. In one example, the second node 420 uses an interface as an input of a decoding algorithm. By way of example, the second node 420 uses a parameter (in) that denotes an input interface as an input of the decoding algorithm. Alternatively, the second node 420 uses a parameter (out) that denotes an output interface as an input of the decoding algorithm.

In another example, the second node 420 uses an index of a face and an interface as an input of a decoding algorithm. By way of example, the second node 420 uses a parameter (face 1, in) that denotes the input interface of "face 1" as an input of the decoding algorithm. Alternatively, the second node 420 uses a parameter (face 3, out) that denotes an output interface of "face 3" as an input of the decoding algorithm.

In another example, the second node 420 manages information of a network domain to which each face is connected. By way of example, the second node 420 manages information of a network domain connected to "face 1" and information of a network domain connected to "face 2". The second node 420 uses the information of the network domain connected to the face and a type of an interface as an input of a decoding algorithm. By way of example, the second node 420 uses (network domain information of face 1, in) that denotes an input from the network domain connected to "face 1" as an input of the decoding algorithm. Alternatively, the second node 420 uses (network domain information of face 3, out) that denotes an output to a network domain connected to "face 3" as an input of the decoding algorithm.

An encoded content name may or may not be able to be decoded based on interface information that is input. When the encoded content name can be decoded by the input interface information, the second node 420 processes the response packet via a corresponding interface. When the encoded content name cannot be decoded by the input interface information, the second node 420 does not process the response packet via the corresponding interface.

When the encoded content name included in the response packet is successfully decoded by the second node 420, the response packet is transmitted to the network 440 in ⑦. The response packet transmitted by the second node 420 is transmitted to the first node 410 via the network 440 in ⑧.

Referring to FIG. 4C, a fourth node 450 is a new requester. The fourth node 450 transmits a request packet including a content name in ⑨. For example, the request packet is "Interest://samsung.com/sait/secu.icon". The request packet transmitted by the fourth node 450 is transmitted to the second node 420 via the network 440 in ⑩.

The second node 420 receives the request packet via the network 440. For example, the second node 420 receives the request packet via the input interface of "face 2". The second node 420 verifies whether the content name included in the request packet is stored in the CS. The second node 420 decodes at least some of encoded content names stored in the CS, and determines whether a response packet corresponding to the content name included in the request packet is stored in the CS based on the decoded content names.

The second node 420 decodes the encoded content names stored in the CS. The second node 420 detects an element corresponding to the content name included in the request packet among elements stored in the CS. For example, the second node 420 detects "/samsung.com/sait/secu.icon (encrypted)" corresponding to the content name included in the request packet from the CS. In this example, the second node 420 transmits a response packet corresponding to the detected "/samsung.com/sait/secu.icon (encrypted)" in response to the request packet.

The second node 420 decodes an encoded content name based on interface information. In one example, the second node 420 uses an interface as an input of a decoding algorithm. By way of example, the second node 420 uses a parameter (in) that denotes an input interface as an input of the decoding algorithm. Alternatively, the second node 420 uses a parameter (out) that denotes an output interface as an input of the decoding algorithm.

In another example, the second node 420 uses an index of a face and an interface as an input of a decoding algorithm. By way of example, the second node 420 uses a parameter (face 1, in) that denotes the input interface of "face 1" as an input of the decoding algorithm. Alternatively, the second node 420 uses a parameter (face 3, out) that denotes an output interface of "face 3" as an input of the decoding algorithm.

In another example, the second node 420 manages information of a network domain to which each face is connected. By way of example, the second node 420 manages information of a network domain connected to "face 1" and information of a network domain connected to "face 2". The second node 420 uses the information of the network domain connected to the face and a type of an interface as an input of the decoding algorithm. By way of example, the second node 420 uses (network domain information of face 1, in) that denotes an input from a network domain connected to "face 1" as an input of the decoding algorithm. Alternatively, the second node 420 uses (network domain information of face 3, out) that denotes an output to a network domain connect to "face 3" as an input of the decoding algorithm.

An encoded content name may or may not be able to be decoded based on interface information that is input. When the encoded content name can be decoded by the input interface information, the second node 420 detects a corresponding element from the CS, and processes a response packet via a corresponding interface. When the encoded content name cannot be decoded by the input interface information, the second node 420 does not detect the corresponding element from the CS, and does not process the response packet via the corresponding interface.

When the element corresponding to the content name included in the request packet is successfully detected by the second node 420 among elements included in the CS, the response packet is transmitted to the network 440 in ⑪. The response packet transmitted by the second node 420 is transmitted to the fourth node 450 via the network 440 in ⑫.

Figure 5:
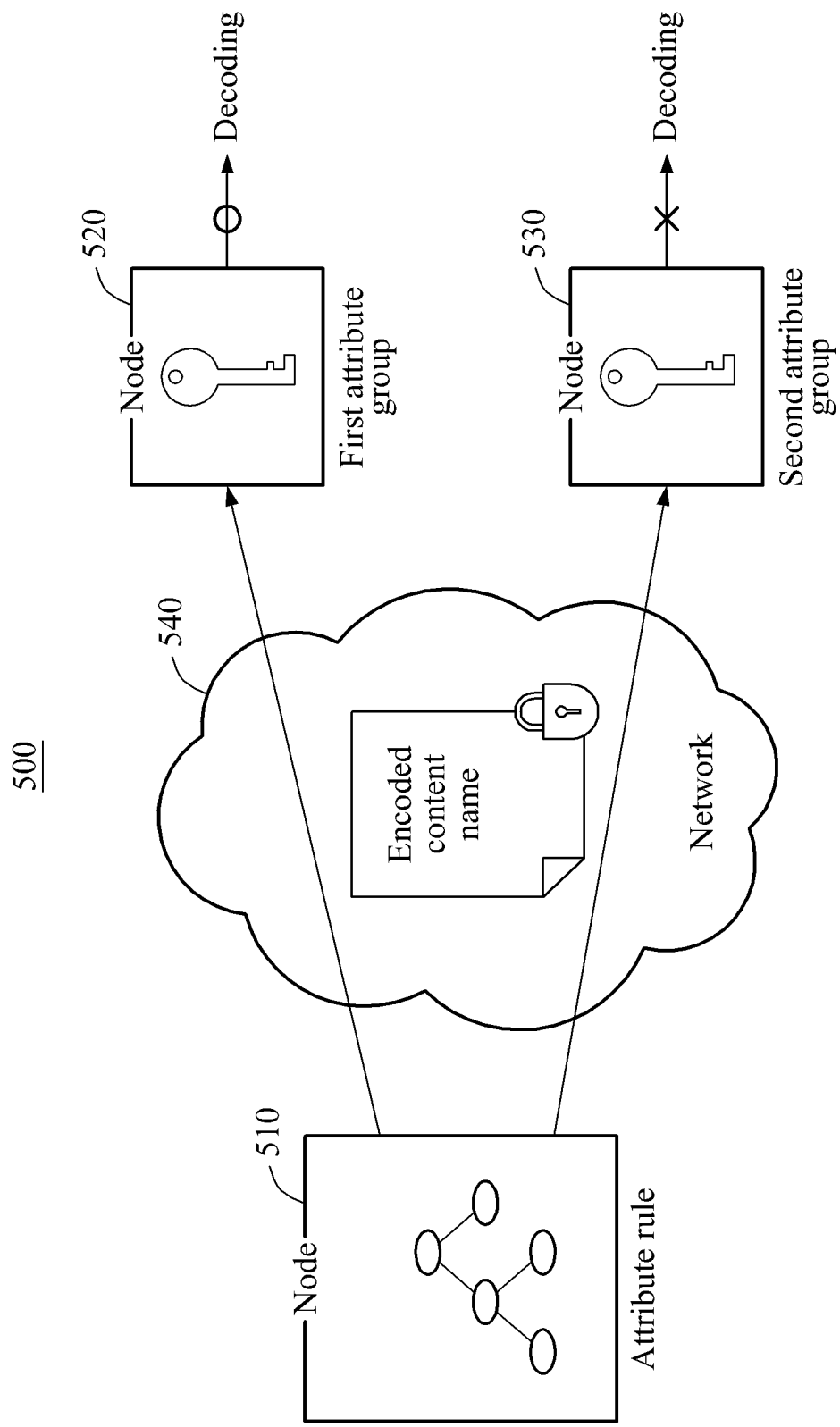
FIG. 5 illustrates an example of an encoding/decoding algorithm used in a network system.
Figure 6A:
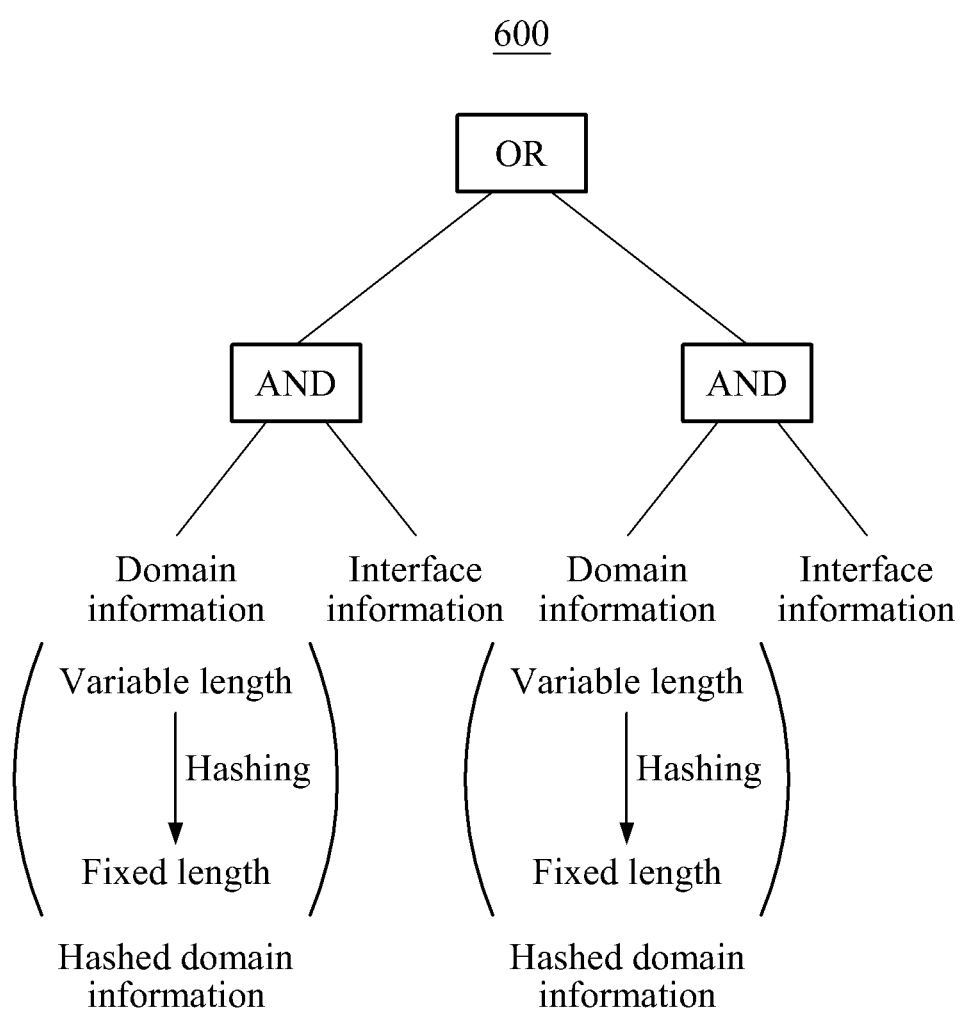
FIGS. 6A and 6B illustrate an example of an attribute rule.
Figure 6B:
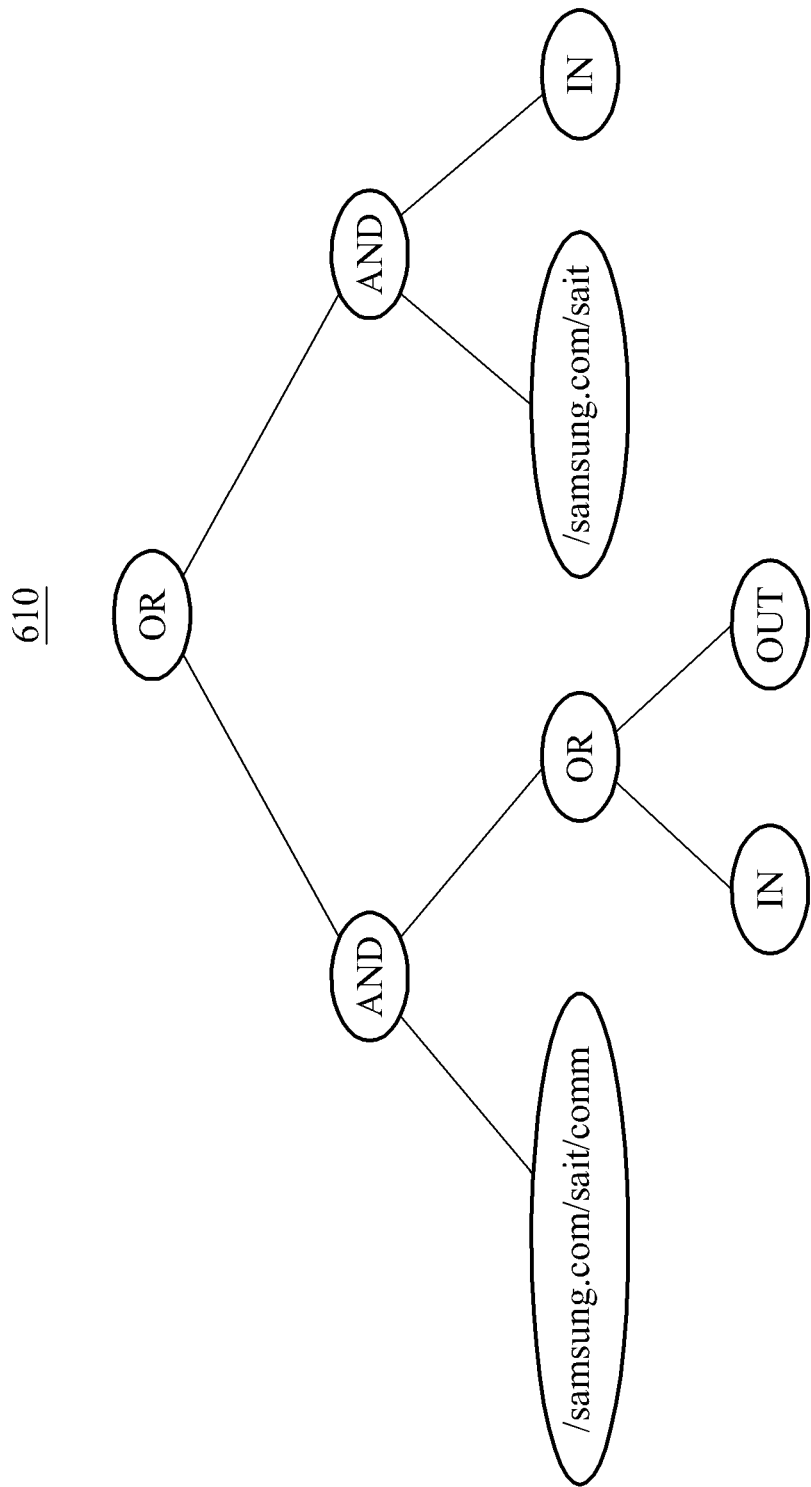

FIG. 5 illustrates an example of an encoding/decoding algorithm used in a network system 500. FIGS. 6A and 6B illustrate an example of an attribute rule.

Referring to FIG. 5, the network system 500 includes a plurality of nodes 510, 520, and 530 connected to a network 540. The node 510 encodes a content name based on an attribute rule. The attribute rule is generated based on a group of attribute information of an object and an access structure of an attribute. The access structure determines whether access is authorized with respect to a given attribute group. The node 510 generates the attribute rule. For example, the node 510 sets the group of attribute information and the access structure. The attribute rule is generated in a form of a tree.

For example, referring to FIG. 6A, the attribute rule is generated in a form of a tree 600. Each leaf node of the tree 600 includes an attribute. The attribute is associated with a network node. For example, the attribute includes domain information associated with a network node, interface information associated with a network node, a department associated with a network node, an area associated with a network node, a management level associated with a network node, a name associated with a network node, and a time associated with a network node. Alternatively, the attribute is associated with content. For example, the attribute includes a validity period of the content.

Intermediate nodes of the tree 600 represent a logic operation or a condition of leaf nodes. For example, intermediate nodes of the tree 600 correspond to an "AND operation", an "OR operation", or "satisfy more than k number among n number".

An attribute of having a variable length may be included in the attribute rule as needed. In this example, the attribute rule also has a variable length. For example, domain information has a variable length, such as "/samsung.com/sait", "/samsung.com/sait/comm", or "/samsung.com/sait/comm/kim".

The variable length attribute is converted to a fixed length to enable the attribute rule to have a fixed length. For example, the domain information is converted to the fixed length by hashing. In this example, a result of the hashing has a fixed length, and the attribute rule includes the result of the hashing having the fixed length rather than the domain information having the variable length.

A content name encoded based on an attribute rule is transmitted from the node 510 to a node 520 and/or a node 530 via the network 540. The node 520 and/or the node 530 decodes the content name encoded based on the attribute of the node 520 and/or the node 530. Each attribute of the node 520 and the node 530 is an attribute group. When each attribute of the node 520 and the node 530 satisfies the attribute rule used in encoding of the encoded content name, the encoded content name is decoded. When each attribute of the node 520 and the node 530 does not satisfy the attribute rule used in the encoding of the encoded content name, the encoded content name cannot be decoded.

For example, referring to FIG. 6B, the attribute rule used in the encoding of the encoded content name is represented by a tree 610. The tree 610, 610, which represents an attribute rule of {"/samsung.com/sait/comm" AND (IN OR OUT)} OR {"/samsung.com/sait" AND IN}.

When a first attribute group of the node 520 is assumed to be {"/samsung.com/sait/comm", OUT}, and a second attribute group of the node 530 is {"/samsung.com/sait", OUT}, the first attribute group of the node 520 satisfies the attribute rule represented by the tree 610. The node 520 can decode a content name encoded based on the first attribute group. Conversely, the second attribute group of the node 530 does not satisfy the attribute rule represented by the tree 610. Thus, the node 530 cannot decode a content name encoded based on the second attribute group.

FIGS. 7 through 10 illustrate examples of a scenario to which the aforementioned examples are applied.

Referring to FIG. 7, a content name 700 includes a plurality of components. For example, the content name 700 includes a domain name 711, a file name 712, and file version information and segmentation information 713. In this example, the domain name 711 and the file name 712 are classified as name components 721, and the file version information and segmentation information 713 is classified as information components 722. The plurality of components have a hierarchical structure that can be employed as routing information for a content request and a content response. For example, the content name 700 is applied to a name-based network system, such as a CCN system or a named data networking (NDN) system.

Figure 8:
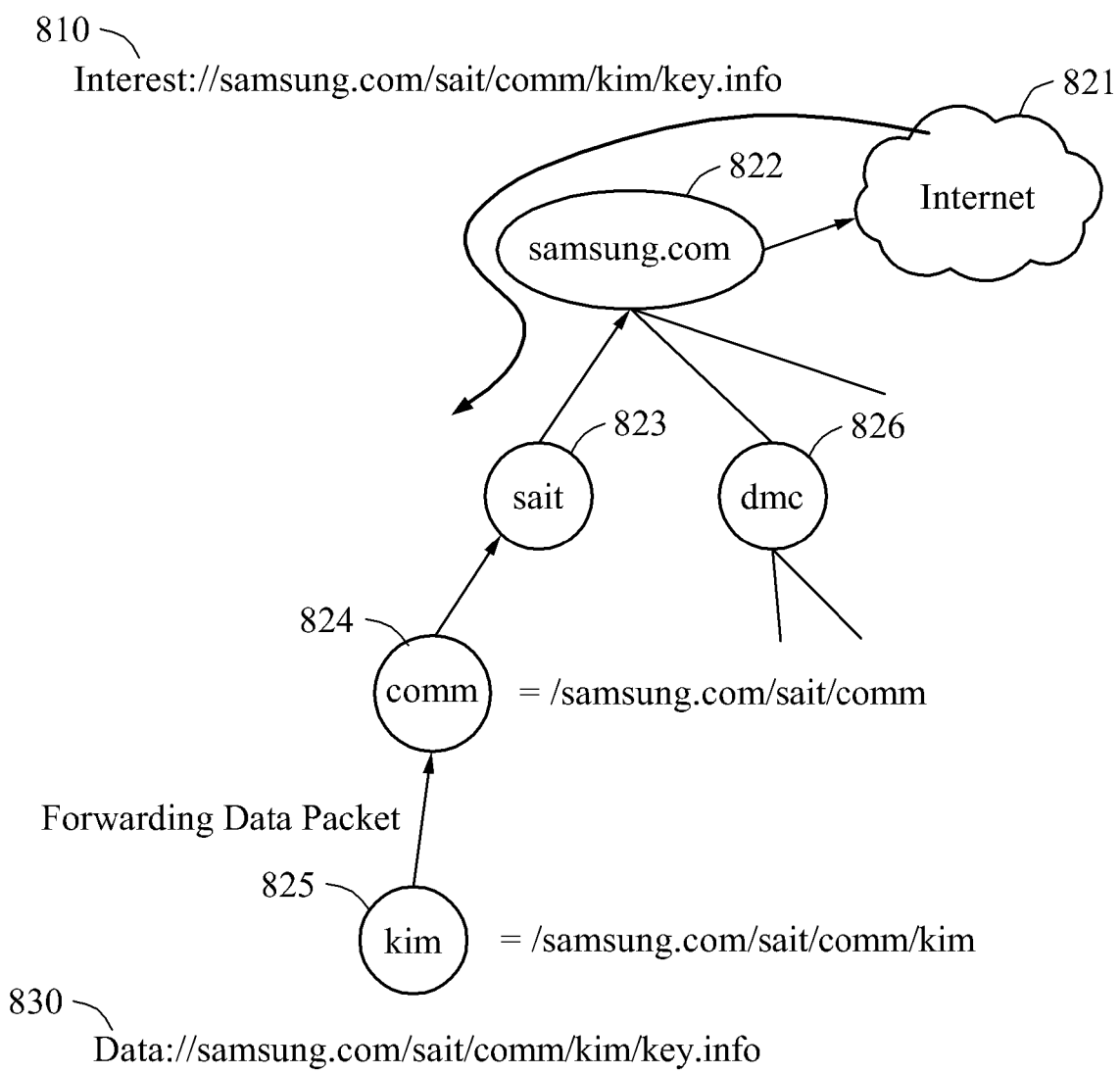

Referring to FIG. 8, an interest packet 810 is transmitted from a high-level network domain to a low-level network domain. Network nodes include a domain router responsible for packet transmission between network domains. Each of the network nodes has a name indicating a network domain corresponding to each of the network nodes. For example, a node 822 corresponds to "/samsung.com", a node 823 corresponds to "/samsung.com/sait", a node 824 corresponds to "/samsung.com/sait/comm", and a node 825 corresponds to "/samsung.com/sait/comm/kim".

A content name requested by the interest packet 810 is "samsung.com/sait/comm/kim/key.info". For example, the interest packet 810 is transmitted from a node that requests content to the node 822 corresponding to "/samsung.com" via the Internet 821.

When content corresponding to the content name "samsung.com/sait/comm/kim/key.info" has not distributed to a network, the interest packet 810 transmitted to the node 822 is transmitted to a node corresponding to the low-level network domain in a sequence. For example, the interest packet 810 is transmitted from the node 822 to the node 823 corresponding to "/samsung.com/sait", then to the node 824 corresponding to "/samsung.com/sait/comm", and then to the node 825 corresponding to "/samsung.com/sait/comm/kim" in a sequence. The interest packet 810 cannot be transmitted to a node 826 corresponding to "/samsung.com/dmc" because the interest packet 810 is transmitted based on the content name "samsung.com/sait/comm/kim/key.info".

The node 825 verifies that content requested from the interest packet 810 is stored in the node 825. The node 825 generates a data packet 830 using the content requested from the interest packet 810.

The data packet 830 is transmitted from the low-level network domain to the high-level network domain. For example, the data packet 830 is transmitted in a sequence from the node 825 corresponding to "/samsung.com/sait/comm/kim", then to the node 824 corresponding to"/samsung.com/sait/comm", then to the node 823 corresponding to"/samsung.com/sait", then to the node 822 corresponding to "/samsung.com", and then to the Internet 821. The data packet 830 is transmitted to the node requesting the content after passing through the Internet 821.

Figure 9:
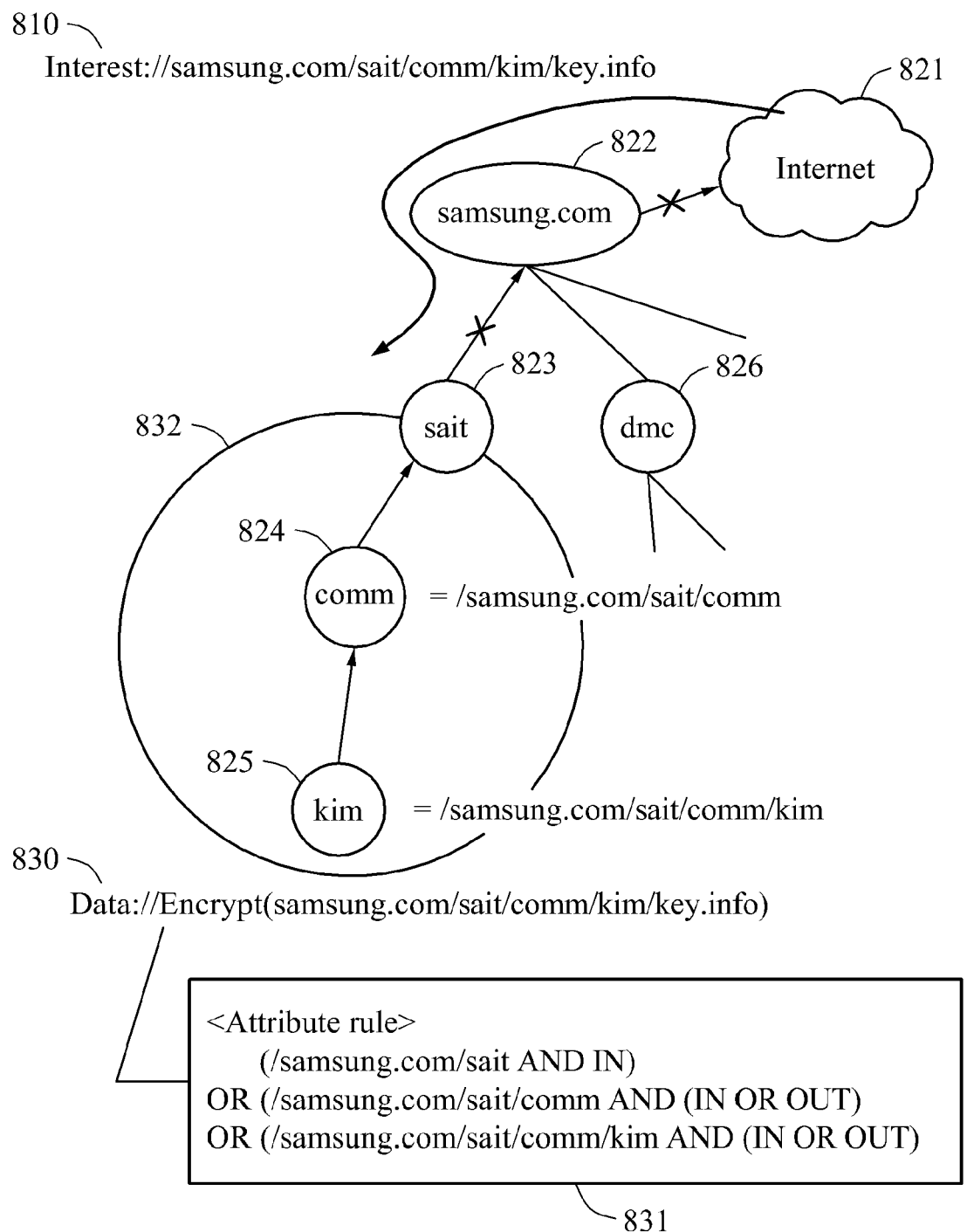

Referring to FIG. 9, the node 825 encodes a content name required for routing or forwarding the data packet 830. The content name is encoded so that a node that attempts to transmit the data packet 830 to an untrustworthy network domain cannot identify the content name. The untrustworthy network domain is a network domain to which transmission of content is unauthorized.

The node that attempts to transmit the data packet 830 to the untrustworthy network domain cannot decode the encoded content name. Accordingly, a data packet is controlled so that the data packet cannot transmitted to an unauthorized node.

In one example, transmission of content to an unintended network domain is prevented by a predetermined router transmitting the data packet 830 using a content name. The content name is encoded, and a router that forwards a data packet to a trustworthy network domain is allowed to decode the encoded content name. Content is shared within a limited network domain.

In one example, a range of a trustworthy network domain is explicitly or implicitly designated by encoding a content name. In this example, the encoded content name is decoded, and at least one router that forwards a data packet including content exists.

In one example, an attribute-based encryption scheme is adopted. For example, a content name is encoded based on an attribute rule with respect to a target authority authorized to have a content access. When an attribute of a predetermined user satisfies an attribute rule used in encoding an encoded content name, the encoded content name is decoded.

A name of a network router, for example, a network domain name represented by a network router, is used as an attribute for encoding. When a content name is encoded, at least one network domain to which content is transmitted is designated. Accordingly, when there are a plurality of routers that are authorized to access the content, a single encoded content name is generated, and a content name need not be encoded a number of times corresponding to a number of authorized routers. Thus, scalability may be enhanced.

Figure 10:
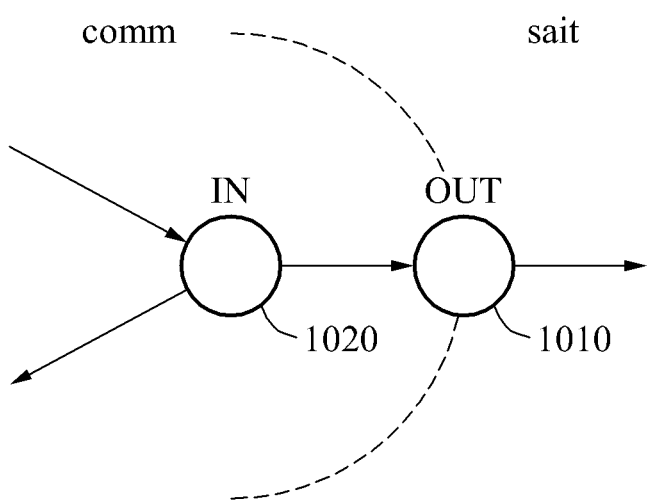

Referring to FIG. 10, a node corresponding to each network domain includes an external router 1010 that forwards a received packet to a high-level network or an external network, and an internal router 1020 that forwards a received packet to a low-level network or an internal network. The external router 1010 and the internal router 1020 may be physically or logically divided.

The external router 1010 has an attribute of interface information corresponding to the outside, and the internal router 1020 has an attribute of interface information corresponding to the inside. For example, the external router 1010 has a "/samsung.com/sait/comm (out)" attribute, and the internal router 1020 has a "/samsung.com/sait/comm (in)" attribute.

Transmission of a data packet is controlled using interface information assigned to a router of a network domain. For example, a high-level or external network is a network to which content transmission is limited, and a low-level or internal network is a network to which content access is authorized. In this example, an attribute rule used for encoding of a content name includes the interface information corresponding to the low-level or internal network, rather than the interface information corresponding to the high-level or external network. Accordingly, in one example, there is provided technology for preventing transmission of a data packet to an external network.

Referring again to FIG. 9, the node 825 encodes a content name to allow content to be public limited to a "sait" domain 832, corresponding to an interest packet that requests "/samsung.com/sait/comm/kim/key.info". For example, the node 825 encodes the content name using an attribute rule 831 limited to the "sait" domain 832.

The attribute rule 831 is designated to be an internal router of a "sait" domain router, or an internal router and an external router of a "comm" domain router, or an internal router and an external router of a "kim" domain router. The data packet 830 including the encoded content name is transmitted limited to the aforementioned routers. Accordingly, content included in the data packet 830 is shared only within the "sait" domain 832.

Figure 11:
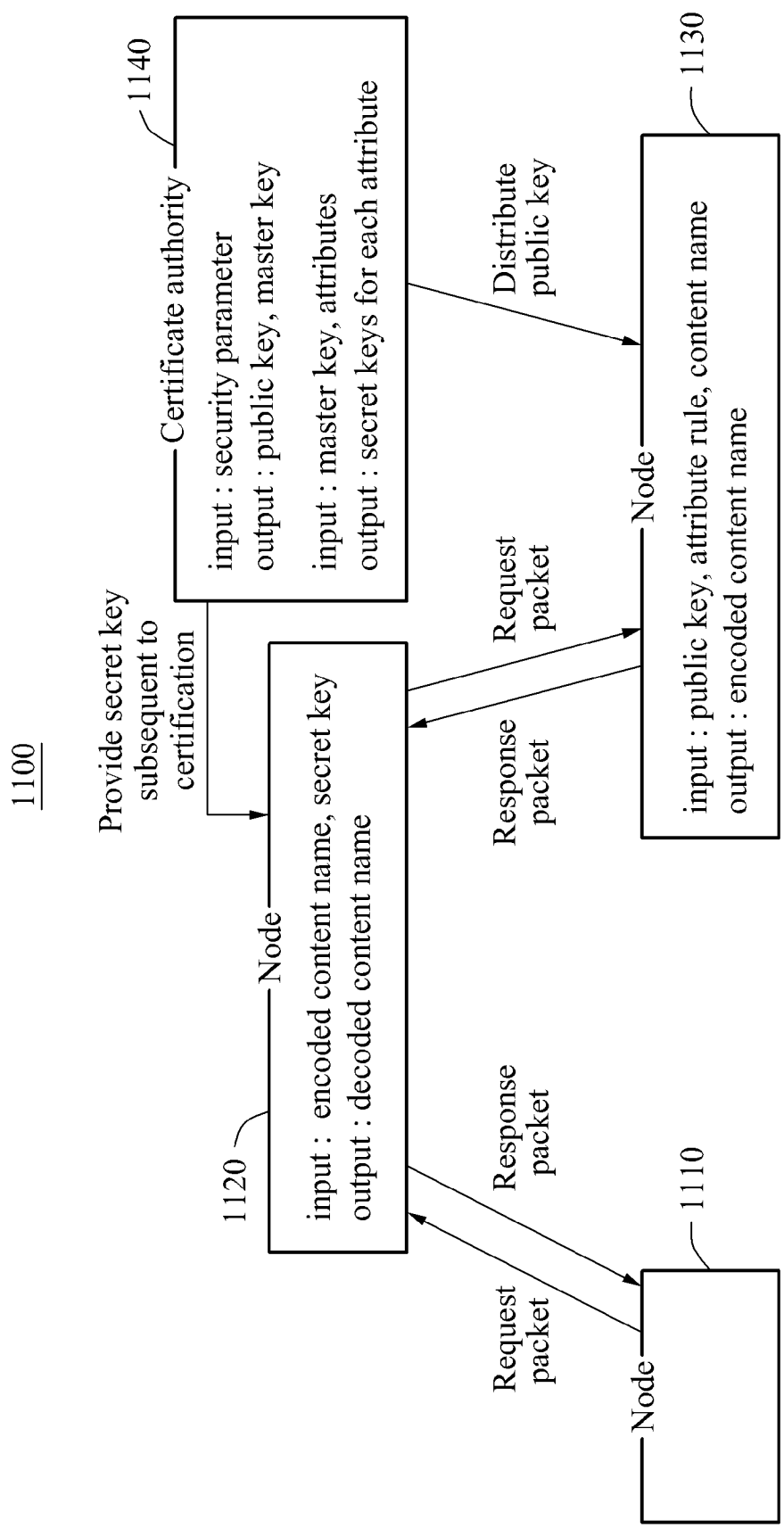
FIG. 11 illustrates an example of a key distribution system.

FIG. 11 illustrate an example of a key distribution system 1100.

Referring to FIG. 11, the key distribution system 1100 includes a plurality of nodes 1110, 1120, and 1130 and a certificate authority 1140.

The certificate authority 1140 generates a public key "PK" and a master key "MK" using a security parameter k. As used herein, the term "security parameter" refers to a parameter used in a mathematical calculation to generate a public key and a master key, for example, including a bilinear group, a prime number, a generator, and a random number. The public key is used in encoding a content name. The certificate authority 1140 distributes the public key to the plurality of nodes in the key distribution system 1100.

The certificate authority 1140 manages a plurality of attributes. For example, the certificate authority 1140 manages an attribute group including a plurality of attributes of the plurality of nodes in the key distribution system 1100. The certificate authority 1140 generates secret keys for the plurality of attributes included in the attribute group. For example, the certificate authority 1140 generates a secret key for each of the plurality of attributes using a master key. The plurality of generated secret keys corresponds to a single public key.

The secret keys are used to decode an encoded content name. The certificate authority 1140 performs certification requested by a node included in the key distribution system 1100, and provides, to a corresponding node, secret keys corresponding to attributes of the certified node. The certificate authority 1140 is referred to as a trustworthy key generation authority.

In the key distribution system 1100, a user is assigned at least one secret key corresponding to an access authority. The user decodes an encoded content name of a data packet to which an access is authorized because the data packet is encoded based on an attribute in the key distribution system 1110.

Assuming that the node 1110 is a request node, the node 1120 is an intermediate node, and the node 1130 is a generation node, the node 1110 transmits a request packet via a network. The request packet is transmitted to the node 1130 after passing through the node 1120.

The node 1130 encodes a content name using a public key distributed by the certificate authority 1140. For example, the node 1130 designates an attribute rule, and encodes the content name using the designated attribute rule and the public key.

A response packet including the encoded content name is transmitted to the node 1120 via the network. The node 1120 performs certification on the certificate authority 1140, and receives, from the certificate authority 1140, secret keys corresponding to attributes of the node 1120. The node 1120 decodes the encoded content name using the secret keys provided through the certification. When the attributes corresponding to the secret keys of the node 1120 satisfy the attribute rule used in the encoding of the encoded content name, the encoded content name is decoded. When the attributes corresponding to the secret keys of the node 1120 do not satisfy the attribute rule used in the encoding of the encoded content name, the encoded content name cannot be decoded.

Figure 12:
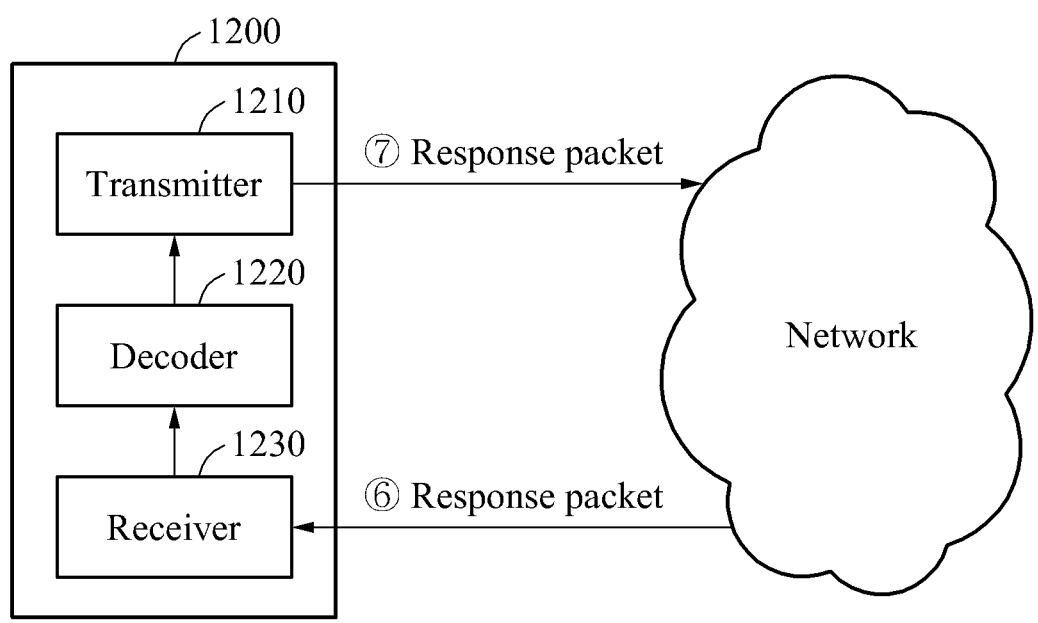
FIG. 12 illustrates an example of a network node.

FIG. 12 illustrates an example of a network node 1200. Referring to FIG. 12, the network node 1200 includes a transmitter 1210, a decoder 1220, and a receiver 1230.

The receiver 1230 receives a response packet including an encoded content name in ⑥. The decoder 1220 decodes the encoded content name, and the transmitter 1230 transmits the response packet based on the decoded content name in ⑦.

The encoded content name is encoded based on a predetermined condition, and decoded in a network node that satisfies the predetermined condition. The predetermined condition is set by a network node that generates the response packet. The predetermined condition is set to limit a network range in which transmission of the response packet is allowed.

The encoded content name is encoded based on an attribute rule including at least one attribute. The at least one attribute includes either one or both of domain information and interface information. The attribute rule is associated with an access authority with respect to content included in the response packet. The attribute rule is generated by a logic operation or a condition with respect to the at least one attribute.

The decoder 1220 decodes the encoded content name based on an attribute of the network node 1200. When the attribute of the network node satisfies an attribute rule used in the encoding of the encoded content name, the encoded content name is decoded. The attribute of the network node includes either one or both of domain information of the network node and interface information of the network node. The encoded content name is encoded using an attribute rule, a public key, and a content name.

The decoder 1220 decodes the encoded content name using at least one secret key corresponding to the attribute of the network node. The network node 1220 may further include a certifier to perform certification on a certificate authority. The receiver 1230 receives, from the certificate authority, at least one secret key corresponding to an attribute of a network node from a plurality of secret keys generated corresponding to a single public key.

The transmitter 1210 extracts request information corresponding to a decoded content name from pre-stored request information, and transmits a response packet based on the extracted request information. The network node 1200 may further include an extractor to decode at least some of encoded content names included in pre-stored response packets, and extract a response packet corresponding to a content name included in a request packet from the pre-stored packets based on the decoded content names. In this example, the receiver 1230 receives the request packet, and the transmitter 1210 transmits the response packet in response to the request packet.

The network node 1200 may further include an extractor configured to extract content corresponding to a content name included in a request packet from pre-stored contents, an encoder configured to encode a content name, and a generator configured to generate a response packet including the content name encoded by the encoder and the extracted content. In this example the receiver 1230 receives the request packet, and the transmitter 1210 transmits the response packet in response to the request packet.

The encoder encodes a content name using an attribute rule, a public key, and a content name. The public key corresponds to a plurality of secret keys, and the content name encoded by the encoder is decoded by at least one secret key corresponding to an attribute that satisfies an attribute rule.

The network node 1200 may further include a first determiner configured to determine whether content corresponding to a content name included in a request packet is present among pre-stored contents, a second determiner configured to decode at least some of encoded content names included in pre-stored response packets, and determine whether a response packet corresponding to a content name included in a request packet is present among the pre-stored response packets based on the decoded content names, and a storage configured to store request information based on a determination that content corresponding to a content name and a response packet corresponding to the content name are absent from the pre-stored contents and the pre-stored response packets. In this example, the receiver 1230 receives a request packet, and the transmitter 1210 transmits the request packet to a network based on a determination that content corresponding to a content name and a response packet corresponding to the content name are absent.

FIG. 13 illustrates an example of a method of operating a network node. Referring to FIG. 13, the method of operating the network includes receiving 1310 a response packet including an encoded content name, decoding 1320 the encoded content name, and transmitting 1330 the response packet based on the decoded content name.

For descriptions of any operations omitted in FIG. 13, reference may be made to analogous features described with respect to FIGS. 1 through 12.

In one example, it is possible to prevent transmission of content or a data packet to an untrustworthy network domain in a name-based network in which a network packet is routed and forwarded based on a content name or a data name.

In another example, technology is provided to determine whether to transmit content based on predetermined conditions in lieu of unconditionally responding, by a node including content to respond with, in a name-based network such as a CCN system. Also, technology is provided to enable access control during content transmission to protect the content.

In another example, it is possible to avoid a waste of network resources and reduce a risk of potential exposure of content by preventing transmission of content included in a data packet to an unauthorized user. Also, it is possible to prevent exposure of a content name including information of a content generator to an unauthorized user.

In another example, it is possible to prevent content from being transmitted, irrespective of routing policy information, to a node in which a content request occurs by providing a protection function with respect to a content name itself.

In another example, it is possible to protect a content name including vital information of a content generator, and limit, based on a cryptographic scheme, a function of a router to prohibit content transmission to an untrustworthy network domain in a name-based network.

In another example, technology is provided to enforce a security policy during routing by encoding a content name. Technology is also provide to encode a content name based on an attribute-based encryption scheme in which attributes are designated to be a domain name and a role of a router. Additionally, technology is provided to determine whether to transmit a data packet based on whether a content name can be decoded in a domain router.

The nodes 110, 120, 130, 150, 410, 420, 430, 450, 510, 520, 530, 821-826, 1110, 1120, 1130, and 1200 in FIGS. 1, 3, 4A, 4B, 4C, 5, 8, 9, 11, and 12, the external router 1010 and the internal router 1020 in FIG. 10, the certificate authority in FIG. 11, and the transmitter 1210, the decoder 1220, and the receiver 1230 in FIG. 12 that perform the various operations described with respect to FIGS. 1-13 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

Functional programs, codes, and code segments for implementing the examples disclosed herein can be easily constructed by a programmer skilled in the art to which the examples pertain based on the drawings and their corresponding descriptions as provided herein.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

While this disclosure includes examples, it will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of operating a network node, the method comprising:
    receiving a response packet comprising an encoded content name;
    storing the response packet;
    decoding the encoded content name;
    transmitting the response packet based on the decoded content name;
    receiving a request packet;

decoding at least some of encoded content names included in pre-stored response packets;

determining whether a pre-stored response packet corresponding to a content name included in the request packet is present among the pre-stored response packets based on the decoded content names; and transmitting the pre-stored response packet in response to the pre-stored response packet being present.

2. The method of claim 1, wherein the encoded content name is encoded based on a predetermined condition;

the network node satisfies the predetermined condition; and the decoding comprises decoding the encoded content name based on the predetermined condition.

3. The method of claim 2, wherein the predetermined condition is set by a network node configured to generate the response packet to limit a network range in which transmission of the response packet is allowed.

4. The method of claim 1, wherein the encoded content name is encoded based on an attribute rule comprising at least one attribute.

5. The method of claim 4, wherein the at least one attribute comprises either one or both of:

domain information; and interface information.

6. The method of claim 4, wherein the attribute rule is associated with an access authority with respect to content included in the response packet.

7. The method of claim 1, wherein the decoding comprises decoding the encoded content name based on an attribute of the network node.

8. The method of claim 7, wherein the decoding comprises decoding the encoded content name in response to the attribute of the network node satisfying an attribute rule used in the encoding of the encoded content name.

9. The method of claim 7, wherein the attribute of the network node comprises either one or both of:

domain information of the network node; and interface information of the network node.

10. The method of claim 1, wherein the encoded content name is encoded using an attribute rule, a public key, and a content name.

11. The method of claim 1, wherein the decoding comprises decoding the encoded content name using at least one secret key corresponding to an attribute of the network node.

12. The method of claim 11, further comprising:

performing certification on a certificate authority; and receiving, from the certificate authority, the at least one secret key corresponding to the attribute of the network node;

wherein the at least one secret key corresponding to the attribute of the network node is one of a plurality of secret keys generated by the certificate authority corresponding to a single public key.

13. The method of claim 1, wherein the transmitting of the response packet comprises:

extracting request information corresponding to the decoded content name from pre-stored request information; and transmitting the response packet based on the extracted request information.

14. The method of claim 1, further comprising:

receiving a request packet;

decoding at least some of encoded content names included in pre-stored response packets;

extracting a response packet corresponding to a content name included in the request packet based on the decoded content names; and transmitting the extracted response packet in response to the request packet.

15. The method of claim 1, further comprising:

receiving a request packet;

extracting a content corresponding to a content name included in the request packet from pre-stored contents;

encoding the content name;

generating a response packet comprising the encoded content name and the extracted content; and transmitting the generated response packet in response to the request packet.

16. The method of claim 15, wherein the encoding comprises encoding the content name using an attribute rule, a public key, and the content name.

17. The method of claim 16, wherein the public key corresponds to a plurality of secret keys; and the encoded content name is decoded by at least one secret key corresponding to an attribute that satisfies the attribute rule.

18. The method of claim 1, further comprising:

determining whether a content corresponding to the content name included in the request packet is present among pre-stored contents;

storing request information based on a result of the determining being that the content corresponding to the content name and the response packet corresponding to the content name are absent; and transmitting the request packet to a network.

19. A non-transitory computer-readable storage medium storing a program comprising instructions to cause a computer to perform the method of claim 1.

20. A network node comprising:

a receiver configured to receive a response packet comprising an encoded content name;

a processor configured to store the response packet, and to decode the encoded content name; and a transmitter configured to transmit the response packet based on the decoded content name, wherein the receiver is further configured to receive a request packet, wherein the processor is further configured to decode at least some of encoded content names included in pre-stored response packets, and to determine whether a pre-stored response packet corresponding to a content name included in the request packet is present among the pre-stored response packets based on the decoded content names, and wherein the transmitter is further configured to transmit the pre-stored response packet in response to the pre-stored response packet being present.

21. A method of operating a network node, the method comprising:

receiving a response packet comprising an encoded content name;

determining whether another network node is authorized to receive the response packet based on the encoded content name;

not transmitting the response packet to the other network node in response to a result of the determining being that the other network node is not authorized to receive the response packet;

transmitting the response packet to the other network node in response to a result of the determining being that the other network node is authorized to receive the response packet;
receiving a request packet;
decoding at least some of encoded content names included in pre-stored response packets;
determining whether a pre-stored response packet corresponding to a content name included in the request packet is present among the pre-stored response packets based on the decoded content names;
determining whether the pre-stored response packet is authorized to be transmitted in response to the request packet; and
transmitting the pre-stored response packet in response to the pre-stored response packet being present and authorized.

22. The method of claim 21, wherein the determining comprises attempting to decode the encoded content name based on information relating to the other network node;

determining that the network node is not authorized to receive the response packet in response to a result of the attempting being that the encoded content name cannot be decoded; and determining that the network node is authorized to receive the response packet in response to a result of the attempting being that the encoded content name is decoded.

23. The method of claim 22, wherein the transmitting comprises transmitting the response packet to the other network node based on the encoded content name.

24. The method of claim 22, wherein the information related to the other network node comprises information on an interface of the network node via which the response packet is to be transmitted to the other network node.

25. The method of claim 22, wherein the information related to the other network node comprises network domain information of the other network node.

\* \* \* \* \*